United States Patent
Glucksman (10) Patent No.: US 10,765,249 B2
(45) Date of Patent: Sep. 8, 2020

(54) BABY FOOD MAKER

(71) Applicant: Dov Z. Glucksman, Winchester, MA (US)

(72) Inventor: Dov Z. Glucksman, Winchester, MA (US)

( * ) Notice: Subject to any disclaimer, the term of this patent is extended or adjusted under 35 U.S.C. 154(b) by 55 days.

(21) Appl. No.: 15/646,441

(22) Filed: Jul. 11, 2017

(65) Prior Publication Data

US 2018/0014683 A1 Jan. 18, 2018

Related U.S. Application Data

(60) Provisional application No. 62/480,402, filed on Apr. 1, 2017, provisional application No. 62/360,998, filed on Jul. 12, 2016.

(51) Int. Cl.
*A47J 27/04* (2006.01)
*A23L 5/10* (2016.01)
*A47J 43/046* (2006.01)

(52) U.S. Cl.
CPC ............. *A47J 27/04* (2013.01); *A23L 5/13* (2016.08); *A47J 43/046* (2013.01); *A23V 2002/00* (2013.01); *A47J 2027/043* (2013.01)

(58) Field of Classification Search
CPC ............. A47J 43/044; A47J 27/004; A47J 2043/04454; A47J 36/28; A47J 27/04; A47J 2027/043; A47J 43/046; A23L 5/13; A23V 2002/00
USPC ......... 99/328, 348, 352, 353, 357, 455, 468, 99/470
See application file for complete search history.

(56) References Cited

U.S. PATENT DOCUMENTS

| | | | | |
|---|---|---|---|---|
| 2002/0001650 A1* | 1/2002 | Kennedy | ................ | A47J 27/04 426/523 |
| 2003/0108343 A1* | 6/2003 | Buzzi | ................ | F22B 1/288 392/403 |
| 2004/0004299 A1* | 1/2004 | Glucksman | ................ | F24F 6/18 261/129 |
| 2007/0006739 A1* | 1/2007 | Fevre | ................ | A47J 43/085 99/348 |
| 2007/0154193 A1* | 7/2007 | Harrison | ................ | A47J 27/21025 392/444 |
| 2008/0047439 A1* | 2/2008 | Tracy | ................ | A47J 27/04 99/339 |
| 2008/0271608 A1* | 11/2008 | Morin | ................ | F22B 1/282 99/294 |
| 2012/0061378 A1* | 3/2012 | Colburn | ................ | A47J 27/04 219/486 |
| 2012/0073450 A1* | 3/2012 | Constans | ................ | A47J 27/04 99/339 |
| 2014/0272059 A1* | 9/2014 | Krebs | ................ | A47J 43/046 426/510 |
| 2015/0327724 A1* | 11/2015 | Jo | ................ | A47J 27/004 99/348 |

(Continued)

*Primary Examiner* — Tu B Hoang
*Assistant Examiner* — Tiffany T Tran
(74) *Attorney, Agent, or Firm* — Frank Marino (57) ABSTRACT

A method and apparatus for steaming and blending food products, also usable for sterilizing baby bottles as needed. The apparatus includes a base including a removable steam chamber and a motor driven drive shaft. A container assembly including a blade assembly can be mounted to the base for steaming the food and for blending the food. The apparatus may further include a steam diverter plate for sterilizing articles such as baby bottles.

15 Claims, 9 Drawing Sheets

(56) References Cited

U.S. PATENT DOCUMENTS

2017/0325635 A1* 11/2017 Wang ................... A47J 27/21
2017/0367516 A1* 12/2017 Hu ....................... A47J 27/04
2018/0140138 A1* 5/2018 Kim ..................... A47J 43/07

* cited by examiner

BABY FOOD MAKER

RELATED APPLICATION

This application claims priority to US Provisional Applications No. 62/360,998 filed on 12-JUL02916 and 62/480,402 filed on 1 Apr. 2017, the teachings of which are incorporated herein in their entirety by reference.

FIELD OF THE INVENTION

This invention relates to an apparatuses and methods for steaming and blending food products.

BACKGROUND OF THE INVENTION

Various appliances have been designed for steaming and/or blending food products. Baby food is often made by steaming food products and then placing them in a blender. While two separate appliances, namely a steamer and a blender, can be employed for making pureed food such as baby food, some appliances have been designed that provide both such functions. U.S. Pat. Nos. 6,076,452, 7,617,766 and 6,550,372 and US Publications Nos. 20130032038, 20140305321 and 20140252146 disclose food processing devices that allow the use of one appliance to steam food products and blend it.

Appliances have also been designed for sterilizing baby bottles. Some sterilizers intended for this purpose have employed steam. U.S. Pat. Nos. 4,544,529 and 5,213,776 disclose such sterilizing appliances.

Since steam is generated within the appliance intended for steaming and/or blending food products it had become apparent that the same appliance could be used for heating or sterilizing baby bottles and other items babies would place in their mouths. U.S. Pat. No. 7,617,766 discloses an appliance designed to perform both functions.

SUMMARY OF THE INVENTION

The present invention is directed to an apparatus and a method for steaming and blending food products. An apparatus in accordance with the invention includes a base having a support for a container. A steam chamber is removably supported by the base and includes a steam exit port. A heater to heat water in the removable steam chamber. A drive shaft extends vertically upwards, rotatably supported by the base and an electric motor is provided for rotating the drive shaft. The apparatus further includes a container assembly including a container, and a lid removably coupled to the top end portion of the container. A steam inlet passage is provided in the container for allowing the entrance of steam generated within the steam chamber. A blade assembly is disposed within the container. The container assembly is mountable to the base.

A method in accordance with the invention includes the steps of providing a base having a support for a container. A steam chamber is removably supported by the base and includes a steam exit port. A heater to heat water in the removable steam chamber. A drive shaft extends vertically upwards, rotatably supported by the base and an electric motor is provided for rotating the drive shaft. The apparatus further includes a container assembly including a container, and a lid removably coupled to the top end portion of the container. A steam inlet passage is provided in the container for allowing the entrance of steam generated within the steam chamber. A blade assembly is disposed within the container. The container assembly is mountable to the base. The method further includes placing the container on the base, introducing food into the container, causing the steam chamber to produce steam, the steam entering the container through the steam inlet passage and steaming the food, and actuating the motor to cause rotation of the drive shaft and coupled blade assembly, thereby blending the food.

A food preparation assembly is further provided in accordance with the invention. The assembly includes an apparatus for steaming and blending food products. The apparatus in accordance with the invention includes a base having a support for a container. A steam chamber is removably supported by the base and includes a steam exit port. A heater to heat water in the removable steam chamber. A drive shaft extends vertically upwards, rotatably supported by the base and an electric motor is provided for rotating the drive shaft. The apparatus further includes a container assembly including a container comprising a base portion and a side wall portion, and a steam inlet passage is provided in the container for allowing the entrance of steam generated within the steam chamber, and a lid removably coupled to the top end portion of the container. A blade assembly is disposed within the container. The container assembly is mountable to the base. A steam diverter plate is selectively positioned in the container. The steam diverter plate comprises a horizontal plate portion proximate said container base portion, including apertures, and a cap portion covering the steam inlet passage whereby steam diverter plate diverts steam from steam inlet passage into the space formed between chamber base portion and the horizontal plate portion of diverter plate. A plurality of bottles and other articles to be sterilized may be placed on top of the horizontal plate portion so that they may be surrounded by steam emanating from apertures for heating and/or sterilizing.

BRIEF DESCRIPTION OF THE DRAWINGS

FIG. 4 A is a cross sectional view of the steam chamber of the baby food steamer of FIG. 1;

FIG. 4 B is a cross sectional view of the steam chamber of the baby food steamer along lines B-B of FIG. 4A;

FIG. 4 C is a partial cross-sectional view of the steam chamber of the baby food steamer along lines C-C of FIG. 4B;

FIG. 4 D is an enlarged cross-sectional view of selected area D-D the steam chamber of the baby food steamer of FIG. 4A;

DETAILED DESCRIPTION OF THE INVENTION

The detailed description which follows is directed to a preferred embodiment of the invention, and is not intended as limiting the invention to the specific structures disclosed.

The invention should instead be construed in accordance with the claims that are appended.

Figure 1:
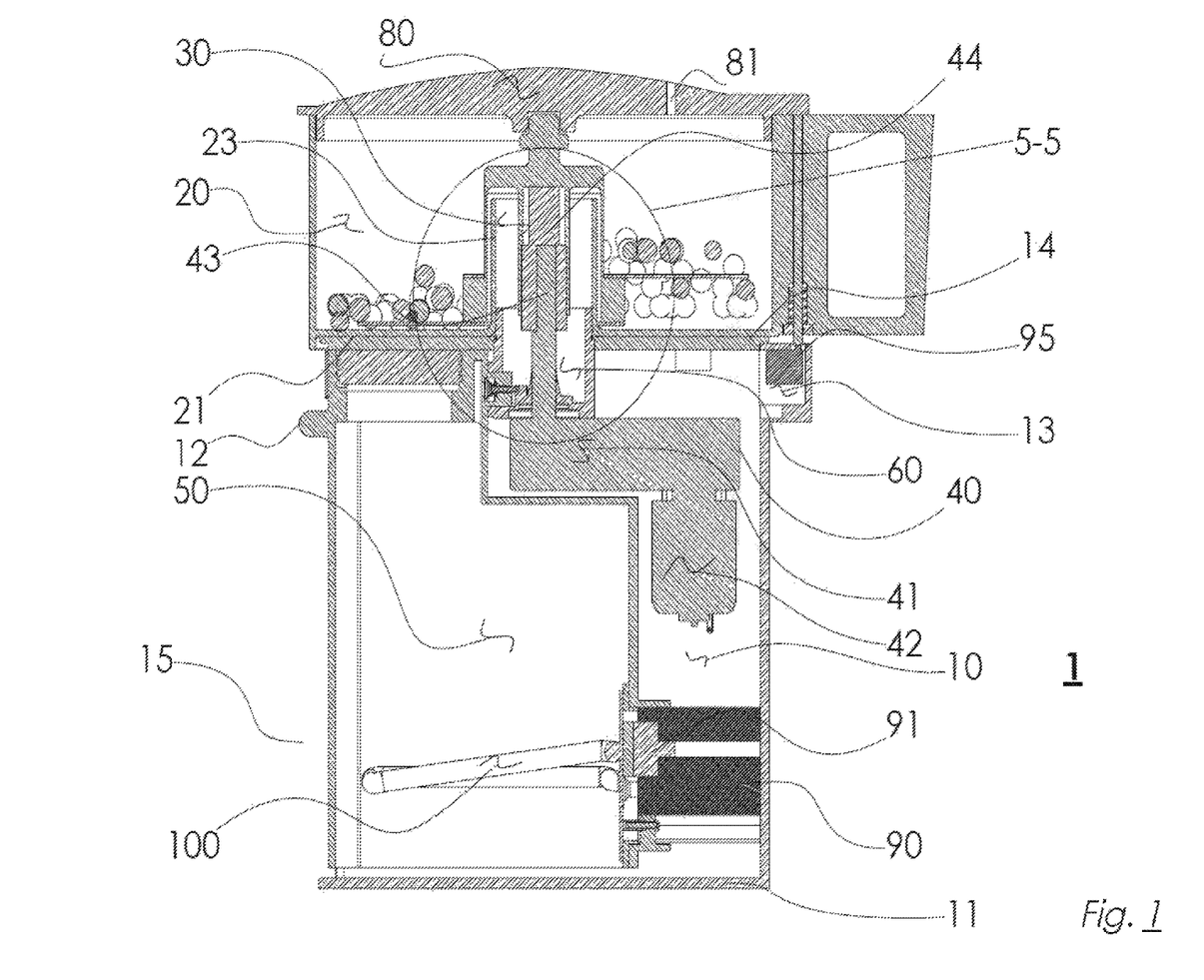
FIG. 1 is a simplified sectional view of the baby food maker according to the invention, configured to make baby food, showing all its components in place including food to be processed.
Figure 2:
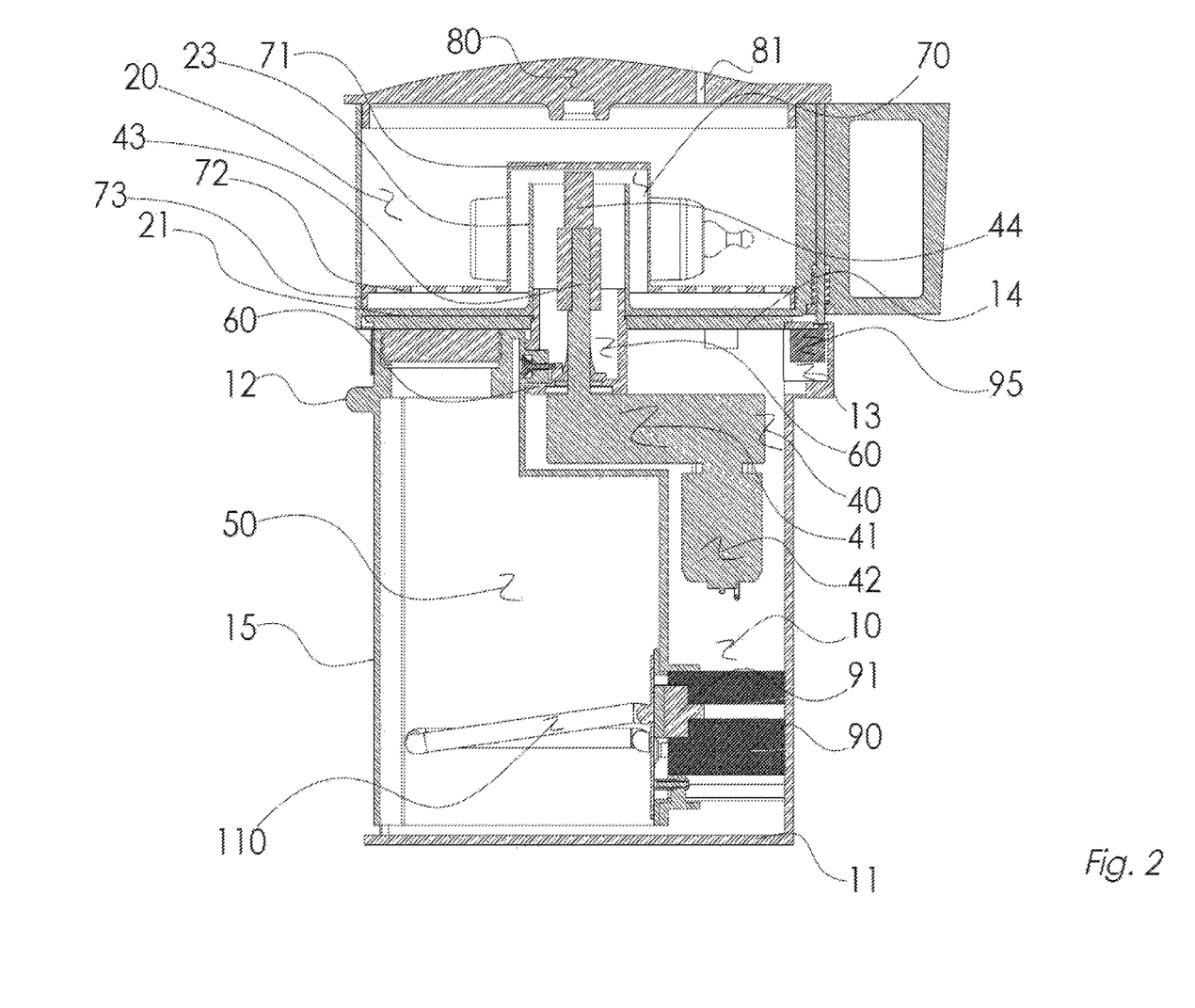
FIG. 2. is a simplified sectional view of the baby food maker according to the invention, configured to sterilize articles, showing all its components in place.

With reference to FIGS. 1 to 2, an apparatus 1 according to the invention is provided. The apparatus can be used for making baby food or other types of pureed foods. As discussed below, it can also be adapted for sterilizing or warming baby bottles or other items such as pacifiers. A base 10 is provided for supporting and securing removable container 20, which, (securing the container to the base is achieved in a manner known in the art, such as a turning bayonet latch), and a gear-motor 40 for driving a blade assembly 30 or other blending device; and for providing means for a removable steam chamber 50 to be engaged and disengaged simultaneously with a steam conduit 60 and with electrical contact box 90.

Referring more specifically to FIGS. 1 and 2, the unit base 10 comprises a bottom 11 and side wall 15, with a top 14 secured to the top of the side wall with screws (not shown), a compartment 13 containing a safety switch 95, and a set of controls (not shown). the enclosure 11 supports the steam chamber 50 which is removable by the operator through opening 16 in unit base 10, for filling with water and for cleaning after use; unit base 10 also contains a gear motor assembly 40 terminating in drive shaft 43 extending upwards; unit base 10 also contains steam conduit 60 sealably connecting to steam outlet of steam chamber 50, when steam chamber is in its engaged position.

Compartment 13 contains a safety switch 95 controlling the operation of the gear motor, which is normally open and is only closed when both container 20 and lid 80 are in place and latched tightly to ensure the rotating blade assembly 30 cannot be accessed by operator.

Referring specifically to FIG. 2, which is like FIG. 1 in all but that the rotating blade assembly 30 is removed and a steam diverter 70 is placed in container 20 proximate its base portion 21. The steam diverter 70 comprises a steam dome section 71 extending above the drive shaft 44 and the inner collar 23 of container 20 thereby diverting steam into the space confined between the base portion 21 of container 20, and perforated plate portion 72 of steam diverter 70; note that the gap is determined by the size of the outer rim 73 of steam diverter 70. Lid 80 with vent opening 81 is shown coupled to container 20, to maintain the container 20 at elevated temperature and to limit the amount of steam allowed to escape during the sterilizing process.

Figure 3:
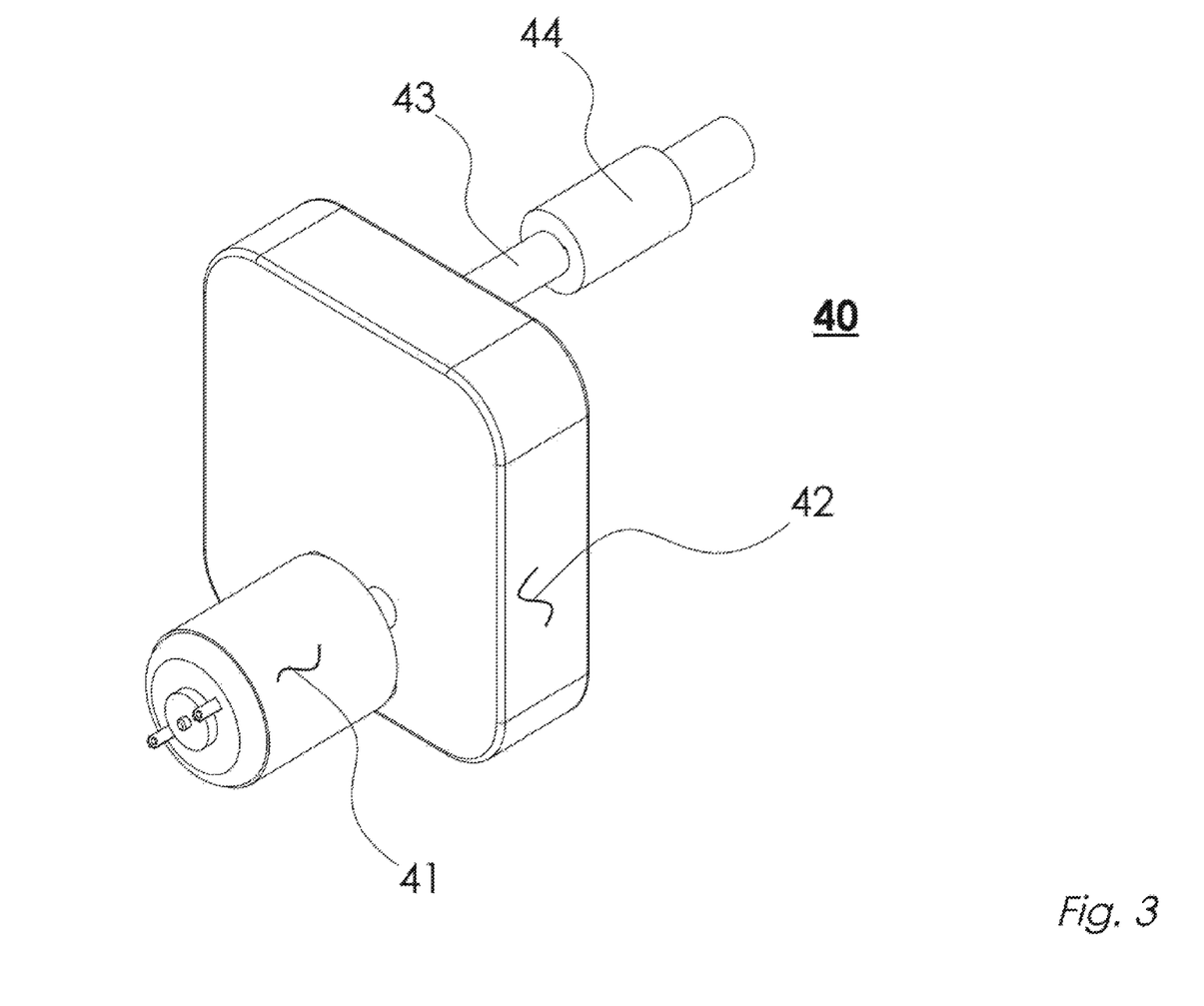
FIG. 3 is an isometric view of the gear motor of FIG. 1.

Referring specifically to FIG. 3, which is an isometric view of the gear motor assembly 40, illustrating an electric motor 41, which typically runs at high speed and low torque. This type of motor is chosen since it is compact and relatively low in cost. To use such a motor to drive the blade assembly of the baby food maker its speed must be reduced, and its torque increased by using a gear box 42, containing but not shown many gears chosen to achieve the rpm and torque required of the output shaft 43. Output shaft 43 is shown with a shaft extension 44 designed to transmit torque from the motor to the blade assembly 30.

Figure 4A:
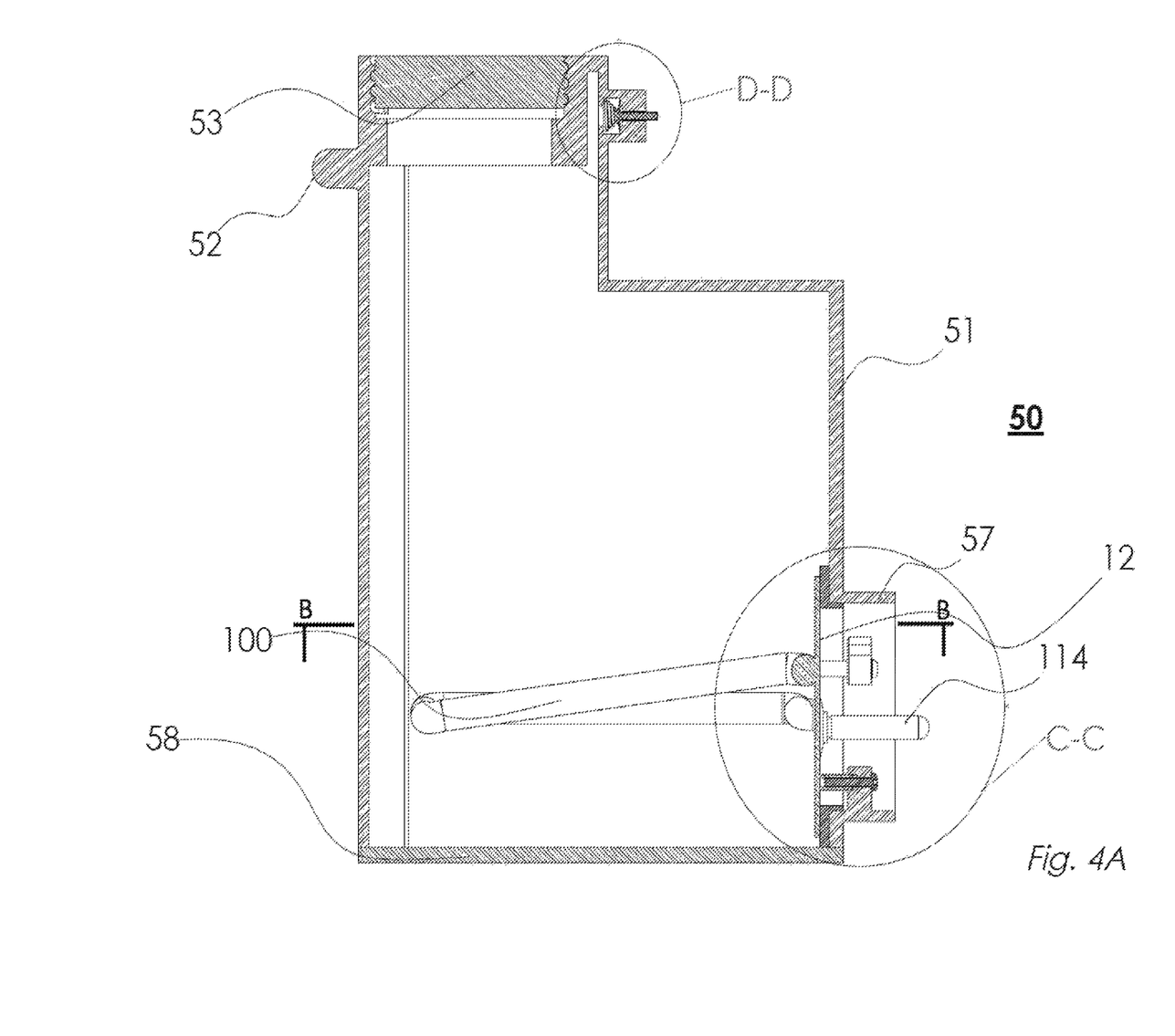
Figure 4B:
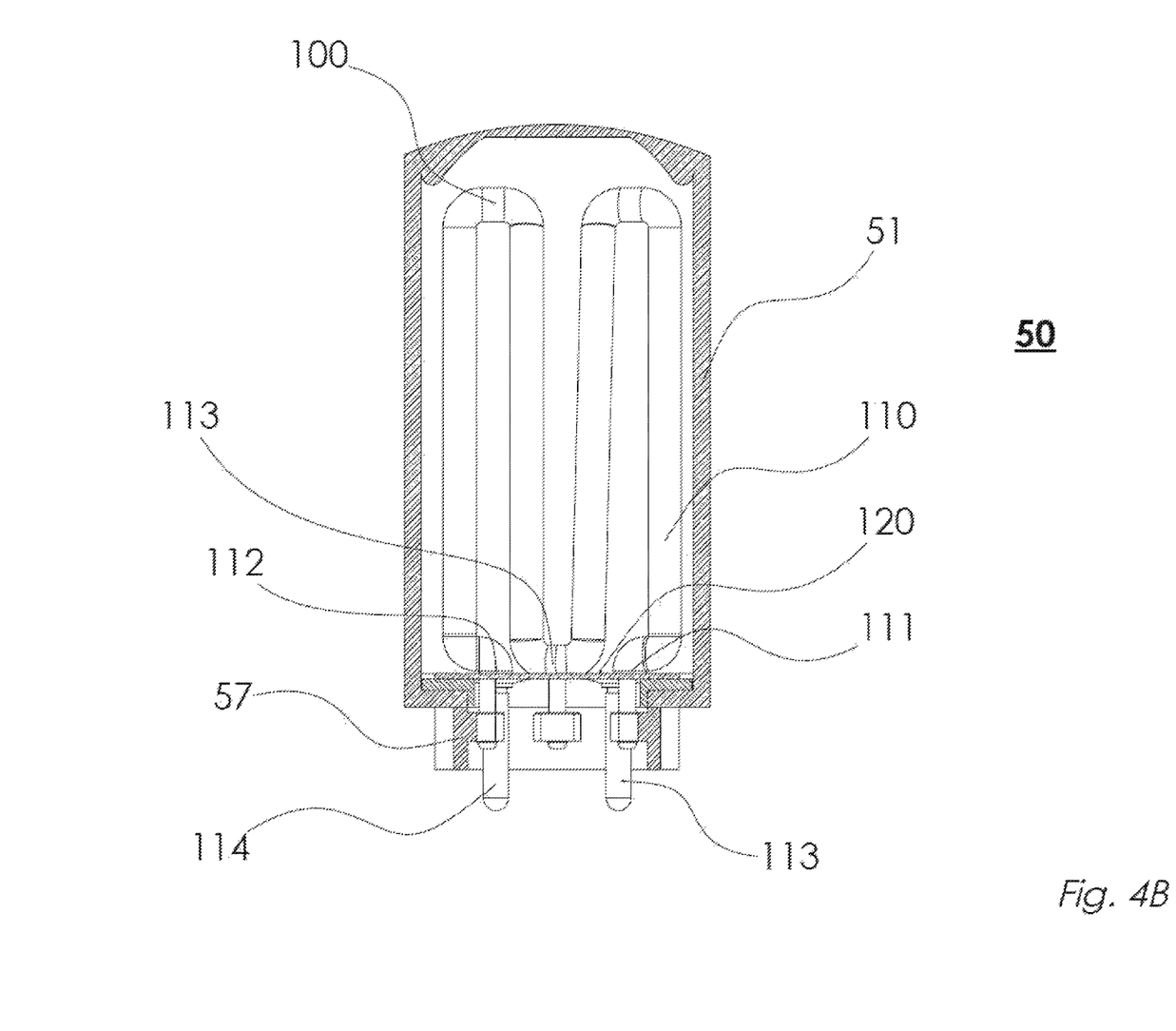

Referring to FIGS. 4A, B, C and D which illustrate several aspects of the steam chamber 50 consisting of a main body 51 made of high temperature plastic capable of withstanding the effects of steam and being free of contaminants (such a material is, for example, Tritan TX 2001 manufactured by Eastman Chemicals), and a bottom portion 58 secured to main body 51 by ultrasonic welding. The steam chamber includes an integrally molded handle 52 for pulling it out of base 10 of the baby food maker and a screwed-on cap 53 for filling the steam chamber with water. Steam chamber incorporates an immersion heater assembly 100 which is shown in greater detail in FIGS. 4 B and C. and a steam outlet assembly 55, shown in greater detail in FIG. 4D.

Figure 4C:
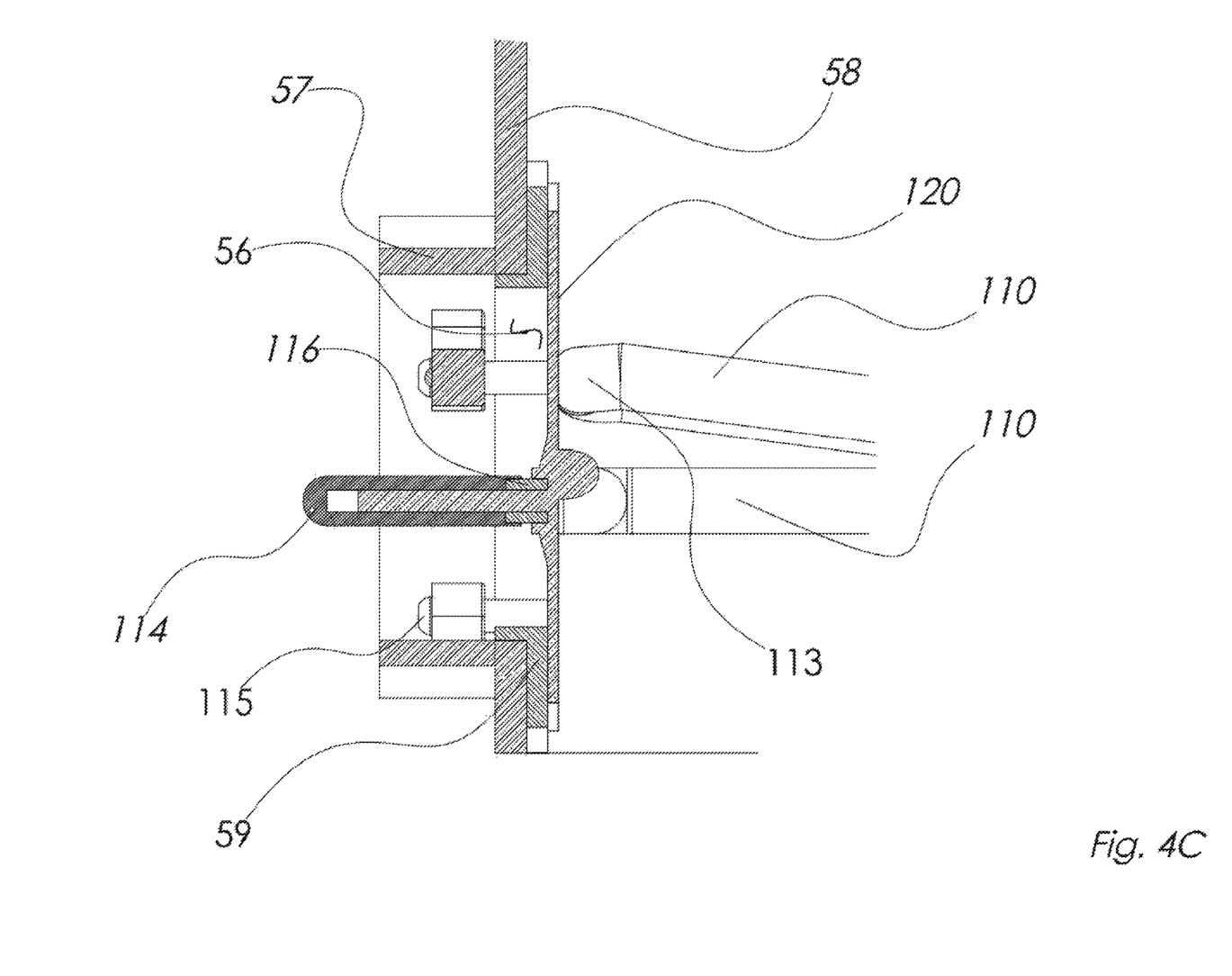

The heater assembly 100 comprises an elongated electric heating rod 110, shaped as a W with its two ends 111 and 112 brazed to a metal plate 120 and its middle portion 113, brazed to same metal plate 120. As shown in FIG. 4C the plate 120 is secured to the side wall of the main body 51 and spans an opening 56 in the enclosure 51. The plate 120 is secured by three screws that connect three threaded posts 115 integral to the plate 120 to three small flanges 58 integral to a short cylindrical member 57 molded from high temperature plastic. Cylindrical member 57 also serves to protect contact pins 114 and 115 from accidentally being bent while the steam chamber is outside the base 10. The plate 120 is spaced apart from the wall of the container 51 through a silicone part 59 which serves to isolate the hot plate from the plastic wall and to seal against water leakage. The contact pins 114 and 115 are of a commonly used design and are crimped to the terminals of the heater 110 and are electrically insulated using silicone bushings (not shown).

Figure 4D:
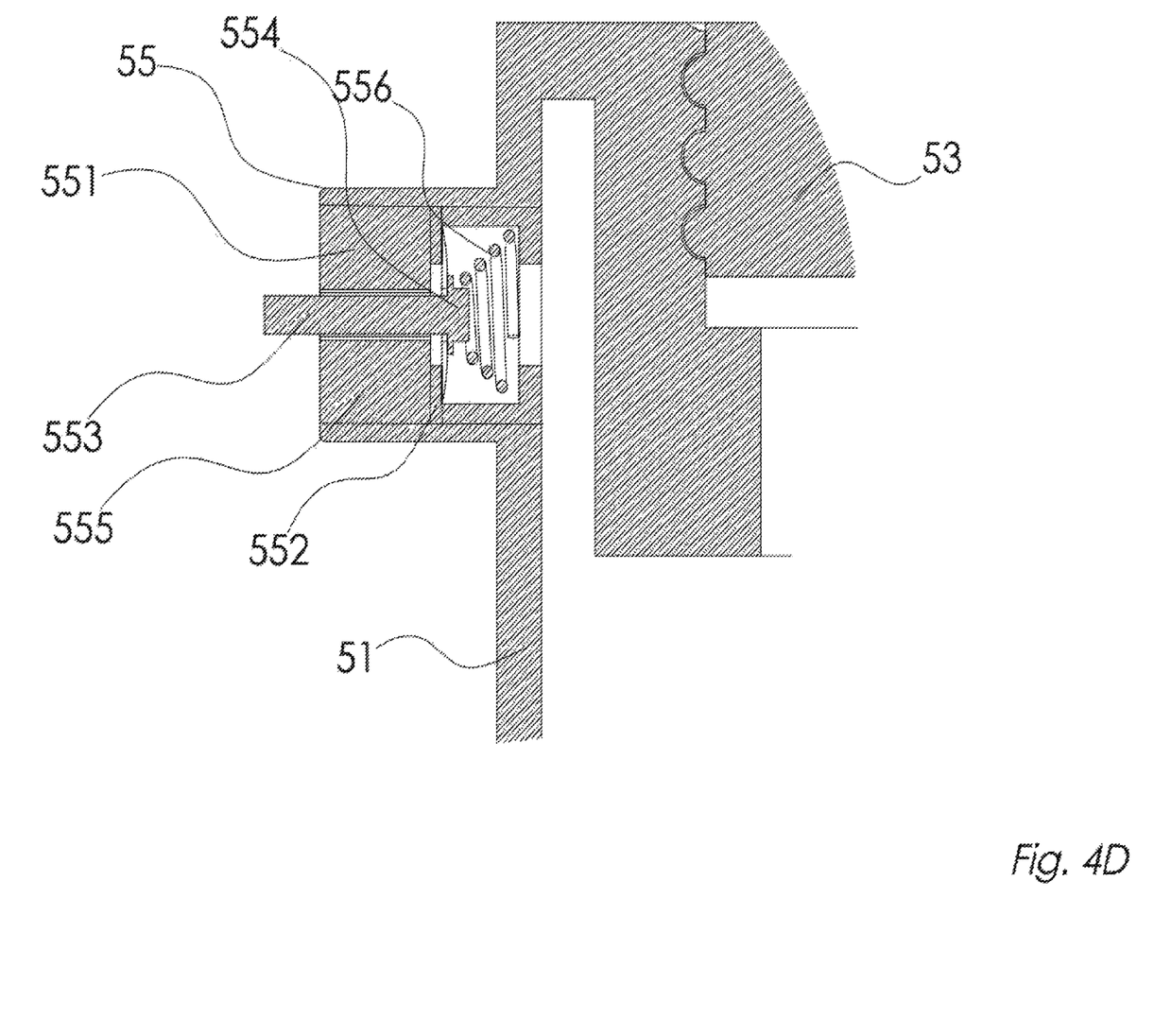

As shown in FIG. 4D the steam outlet 55 includes a valve assembly 551, comprising the valve seal 552 made of a flexible material such as silicone mounted on a valve stem 553, and a valve body comprising an annular valve seat 554 with four forwardly extending radial ribs 555 for supporting and guiding the valve stem as it slides back and forth. The valve is designed to remain normally shut by the force exerted on the seal by spring 556. When the steam chamber is pushed into the base 10 the stem is pushed back by a vertical rib 66 in the steam conduit 60 thereby maintaining the valve in an open position for delivering steam as it is generated in the steam chamber.

Figure 5:
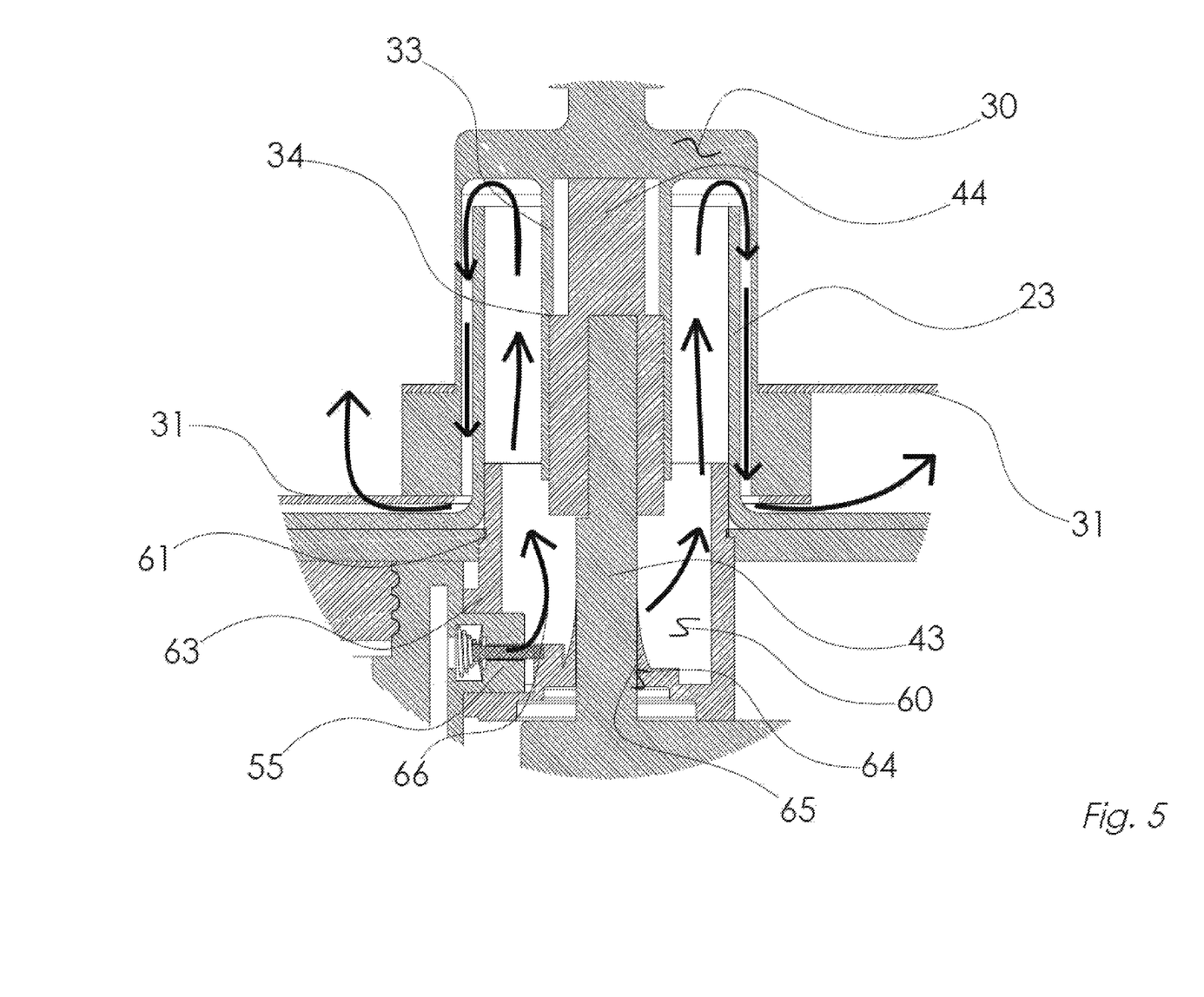
FIG. 5 is an enlarged sectional view of the selected area A-A of FIG. 1 according to a preferred embodiment of the invention.

FIG. 5 shows in greater detail the steam conduits 60 used to conduct steam from the steam chamber to the bottom of the container for ensuring that all the food in the container is enveloped by steam. The steam conduit is a flexible molded part, preferably made from high temperature silicone. It comprises a vertical cylindrical portion 61 including a collar 63 extending sideward for receiving steam outlet 55 of steam chamber 50, in a sealable state. The conduit 60 further comprises a bottom member 62, which is firmly connected to the gear box 42 so that its bottom opening 94 is aligned with the gear box shaft 43. A rotary seal 65 of a design known in the art is part of the bottom opening 64 and serves to engages the gear box shaft 43 to ensure that no steam escapes from the conduit down the shaft. A freestanding rib 66 rising from the bottom member 62 is positioned so it would push the steam 553 of the steam outlet back to overcome the force of the spring 556 thereby keeping the valve open for steam to flow into conduit and from there into the container 20. Series of arrows show the flow of steam from the steam outlet 55 through the conduit 60 and through the blade assembly hub, and out into the container 20, at a point near the base of the container, to ensure that it covers all food particles placed in the container. Blade assembly 30 comprises a shaft collar 33 designed to engage shaft extension 44 in a manner that allows it to slip in and out yet can transfer rotational torque from the gear motor shaft to the blades 31 and 32. Shown are a series of interlocking axial ribs 34 as one possible option.

Figure 6:
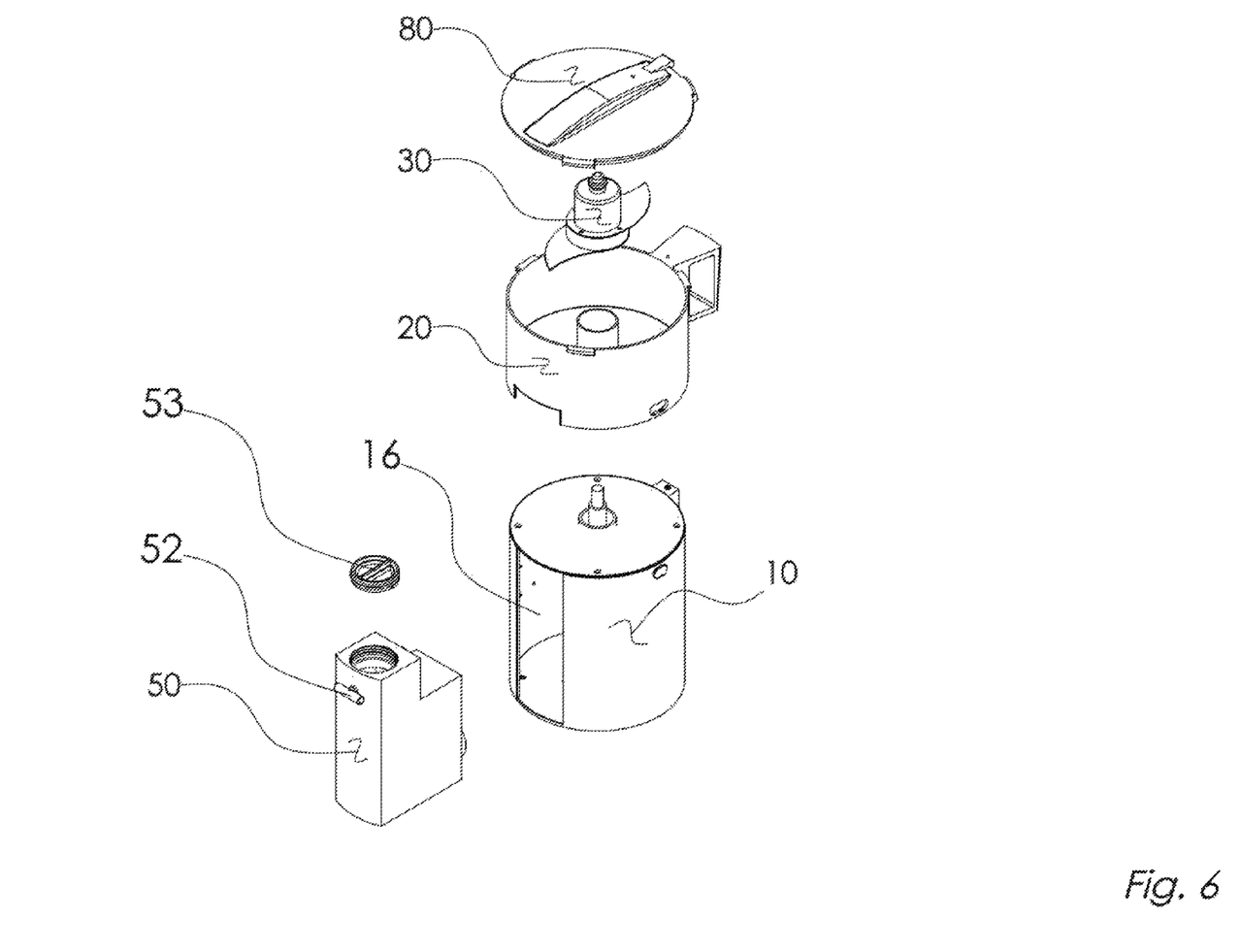
FIG. 6 is an exploded isometric view of the baby food maker of FIG. 1.

FIG. 6 shows the baby food maker with the steam chamber 50 removed from the base 10, and its cap removed as operator would do to fill it with fresh water. Also shown is the blade assembly 30 after being removed from the drive shaft to allow the container 20 to be lifted off the base as would be the case when the operator wants to wash the container. The lid 80 is also shown separated from the container, as would be the case when the user wishes to place food in the container or remove the cooked food from it.

I claim:

1. An apparatus for steaming and blending food products and for heating or for sterilizing articles comprising:
   a base;
   a steam generating chamber supportable on the base and removable therefrom, and including a steam exit port;
   a heater for providing heat to the steam generating chamber;
   a drive shaft;
   an electric motor supported by the base and operatively associated with the drive shaft;
   a container assembly positionable on top of the base in an upright orientation and including a container;
   the container comprising;
   a bottom;
   a side wall,
   a steam inlet passage;
   the container assembly further comprising;
   a lid removably coupled to a top of the side wall; and
   a blade assembly disposed within the container;
   wherein the container assembly is positionable in the upright orientation relative to the base such that the drive shaft projects into the container and connects the blade assembly;
   wherein the steam exit port is in fluid communication with the steam inlet passage when the steam generating chamber is supported on the base and the container is positioned in the upright orientation relative to the base;
   wherein the steam generating chamber comprises a water supply tank with the heater disposed within the water supply tank for generating steam therein; the water supply tank, heater and steam exit port being configured within a singular assembly that is removable together as the singular assembly from the base, and the steam generating chamber having electrical contacts extending externally therefrom for electrical disconnection of the heater from the base when the steam generating chamber is removed therefrom;
   and wherein the container is removable from the base individually of the steam generating chamber;
   wherein the water supply tank comprises a removable cap and the singular assembly is configured to be taken from the base and supplied with water when the cap is removed:
   and wherein the steam exit port comprises a normally closed valve disposed adjacent the top of the steam generating chamber and adjacent the steam inlet passage which is opened by the container when the container is positioned in the upright orientation.

2. The apparatus of claim 1, wherein the container assembly is supportable on the base and removable there-from for emptying contents thereof and for cleaning;
   when the container assembly is supported on the base in the upright orientation, it is positioned relative thereto such that the drive shaft projects into the container and is connectable to the blade assembly; and wherein
   when the steam generating chamber is supported on the base and the container is positioned in the upright orientation relative to the base, the steam exit port is in fluid communication with the steam inlet passage.

3. The apparatus of claim 2, wherein the blade assembly is removable from the container;
   when the container assembly is supported on the base in the upright orientation, the drive shaft projects into the container and receives the blade assembly; and wherein
   when the steam generating chamber is supported on the base and the container is positioned in the upright orientation relative to the base, the steam exit port is in fluid communication with the steam inlet passage.

4. The apparatus of claim 1, wherein the heater is integral to the steam generating chamber.

5. The apparatus of claim 4, wherein the heater terminates in the electrical contacts for connecting to electric outlets in the base when the steam generating chamber is supported thereon.

6. The apparatus of claim 3 further comprising a container base portion comprising a steam diverter supportable within the container proximate the container base portion and comprising:
   a horizontal plate including one or more apertures, and
   a cap portion for covering the steam inlet passage; wherein
   the horizontal plate diverts steam from the steam inlet passage through a space formed between the container base portion and the horizontal plate and through the one or more apertures; and wherein articles to be sterilized may be placed on the horizontal plate so that they may be surrounded by steam emanating from the one or more apertures for being heated or sterilized.

7. The apparatus of claim 1, wherein the base further comprises one or more supports and the lid further comprises one or more locking elements for securing the container assembly to the one or more supports.

8. The apparatus of claim 7 wherein the base, the container and the lid are engagable together; and further comprising means for disabling the electric motor when the base, the container, and the lid are not engaged together.

9. The apparatus of claim 1, wherein the drive shaft and the electric motor are operatively associated through speed reduction means.

10. The apparatus of claim 9 wherein the speed reduction means are from the group including gearing and drive belts.

11. The apparatus of claim 1, wherein the heater is controlled by a timing circuit.

12. A method for preparing food comprising:
    providing
    a base,
    a drive shaft,
    an electric motor supported by the base and operatively associated with the drive shaft,
    a container assembly comprising;
    a container having a bottom and a side wall,
    a steam inlet passage, and
    a blade assembly disposed within the container;
    the container assembly positionable in an upright orientation relative to the base
    such that drive shaft projects into the container and connects to the blade assembly; placing a steam generating chamber in the base to bring a steam exit port thereof into fluid communication with the steam inlet passage;
    the steam generating chamber comprising a water supply tank with a heater disposed there-within for generating steam within the steam generating chamber; the water supply tank, heater and steam exit port being removable together from the base, and the steam generating chamber having electrical contacts extending externally therefrom for electrical disconnection of the heater from the base when the steam generating chamber is removed therefrom;
disposing the food in the container;
coupling a lid to a top end portion of the side wall;
causing the steam generating chamber to produce steam, wherein the steam enters the container in the upright orientation through the steam inlet passage and steams the food;
actuating the electric motor to cause rotation of the drive shaft and the blade assembly, thereby blending the food; and wherein the container is removable from the base individually of the steam generating chamber;
wherein the water supply tank, heater and steam exit port are configured within a singular assembly that is removable as the singular assembly from the base:
wherein the water supply tank comprises a removable cap and the singular assembly is configured to be taken from the base and supplied with water when the cap is removed: and wherein the steam exit port comprises a normally closed valve disposed adjacent the top of the steam generating chamber and adjacent the steam inlet passage which is opened by the container when the container is positioned in the upright orientation.

13. A method for preparing food, comprising:
providing
a base;
a drive shaft; and
an electric motor supported by the base and operatively associated with the drive shaft; placing a container assembly onto the base, the container assembly comprising;
a container having a bottom and a side wall,
a steam inlet passage, and
a blade assembly disposed within the container, wherein
the container assembly is positioned in an upright orientation relative to the base such that the drive shaft projects into container and connects to the blade assembly;
placing a steam generating chamber in the base to bring a steam exit port thereof into fluid communication with the steam inlet passage;
the steam generating chamber comprising a water supply tank with a heater disposed there-within for generating steam within the steam generating chamber; the water supply tank, heater and steam exit port being removable together from the base, and the steam generating chamber having electrical contacts extending externally therefrom for electrical disconnection of the heater from the base when the steam generating chamber is removed therefrom;
disposing the food in the container;
coupling a lid to a top end portion of the side wall;
causing the steam generating chamber to produce steam, wherein the steam enters the container in the upright orientation through the steam inlet passage and steams the food;
actuating the motor to cause rotation of the drive shaft and the blade assembly, thereby blending the food; and wherein the container is removable from the base individually of the steam generating chamber;
wherein the water supply tank, heater and steam exit port are configured within a singular assembly that is removable as the singular assembly from the base:
wherein the water supply tank comprises a removable cap and the singular assembly is configured to be taken from the base and supplied with water when the cap is removed: and
wherein the steam exit port comprises a normally closed valve disposed adjacent the top of the steam generating chamber and adjacent the steam inlet passage which is opened by the container when the container is positioned in the upright orientation.

14. A method for preparing food, comprising:
providing
a base; a drive shaft; and
an electric motor supported by the base and operatively associated with the drive shaft;
placing a container assembly in an upright orientation onto the base, the container assembly comprising;
a container having a bottom and a side wall; and
a steam inlet passage; wherein
the container assembly is positioned relative to the base such that drive shaft projects into the container;
connecting the blade assembly to the drive shaft;
placing a steam generating chamber in the base to bring a steam exit port thereof into fluid communication with the steam inlet passage;
the steam generating chamber comprising a water supply tank with a heater disposed there-within for generating steam within the steam generating chamber; the water supply tank, heater and steam exit port being removable together from the base, and the steam chamber having electrical contacts extending externally therefrom for electrical disconnection of the heater from the base when the steam chamber is removed therefrom;
disposing the food in the container;
coupling a lid to a top end portion of the side wall;
causing the steam generating chamber to produce steam, wherein the steam enters the container in the upright orientation through the steam inlet passage and steams the food;
actuating the motor to cause rotation of the drive shaft and the blade assembly, thereby blending the food; and wherein the container is removable from the base independently of the steam generating chamber;
wherein the water supply tank, heater and steam exit port are configured within a singular assembly that is removable as the singular assembly from the base:
wherein the water supply tank comprises a removable cap and the singular assembly is configured to be taken from the base and supplied with water when the cap is removed: and wherein the steam exit port comprises a normally closed valve disposed adjacent the top of the steam generating chamber and adjacent the steam inlet passage which is opened by the container when the container is positioned in the upright orientation.

15. A method for sterilizing articles, comprising:
providing
a base;
a drive shaft; and
an electric motor supported by the base and operatively associated with the drive shaft;
placing a container assembly onto the base, the container assembly comprising;
a container having a bottom and a side wall; and
a steam inlet passage; wherein
the container assembly is placed in an upright orientation in relationship to the base such that drive shaft projects into the container;

placing a diverter plate into the container assembly proximate the bottom;

placing a steam generating chamber in the base to bring a steam exit port thereof into fluid communication with the steam inlet passage;

the steam chamber comprising a water supply tank with a heater disposed there-within for generating steam within the steam generating chamber; the water supply tank, heater and steam exit port being removable together from the base, and the steam chamber having electrical contacts extending externally therefrom for electrical disconnection of the heater from the base when the steam chamber is removed therefrom;

introducing one or more articles to be sterilized on top of a horizontal plate of the diverter plate;

coupling a lid to a top end portion of the side wall;

causing the steam generating chamber to produce steam, wherein the steam enters the container in the upright orientation through the steam inlet passage and sterilizes the one or more articles; and wherein the container is removable from the base individually of the steam generating chamber;

wherein the water supply tank, heater and steam exit port are configured within a singular assembly that is removable as the singular assembly from the base:

wherein the water supply tank comprises a removable cap and the singular assembly is configured to be taken from the base and supplied with water when the cap is removed:

and wherein the steam exit port comprises a normally closed valve disposed adjacent the top of the steam generating chamber and adjacent the steam inlet passage which is opened by the container when the container is positioned in the upright orientation.

* * * * *